J. C. CANFIELD.
PLANTER.
APPLICATION FILED JUNE 8, 1915.
1,325,139.
Patented Dec. 16, 1919.
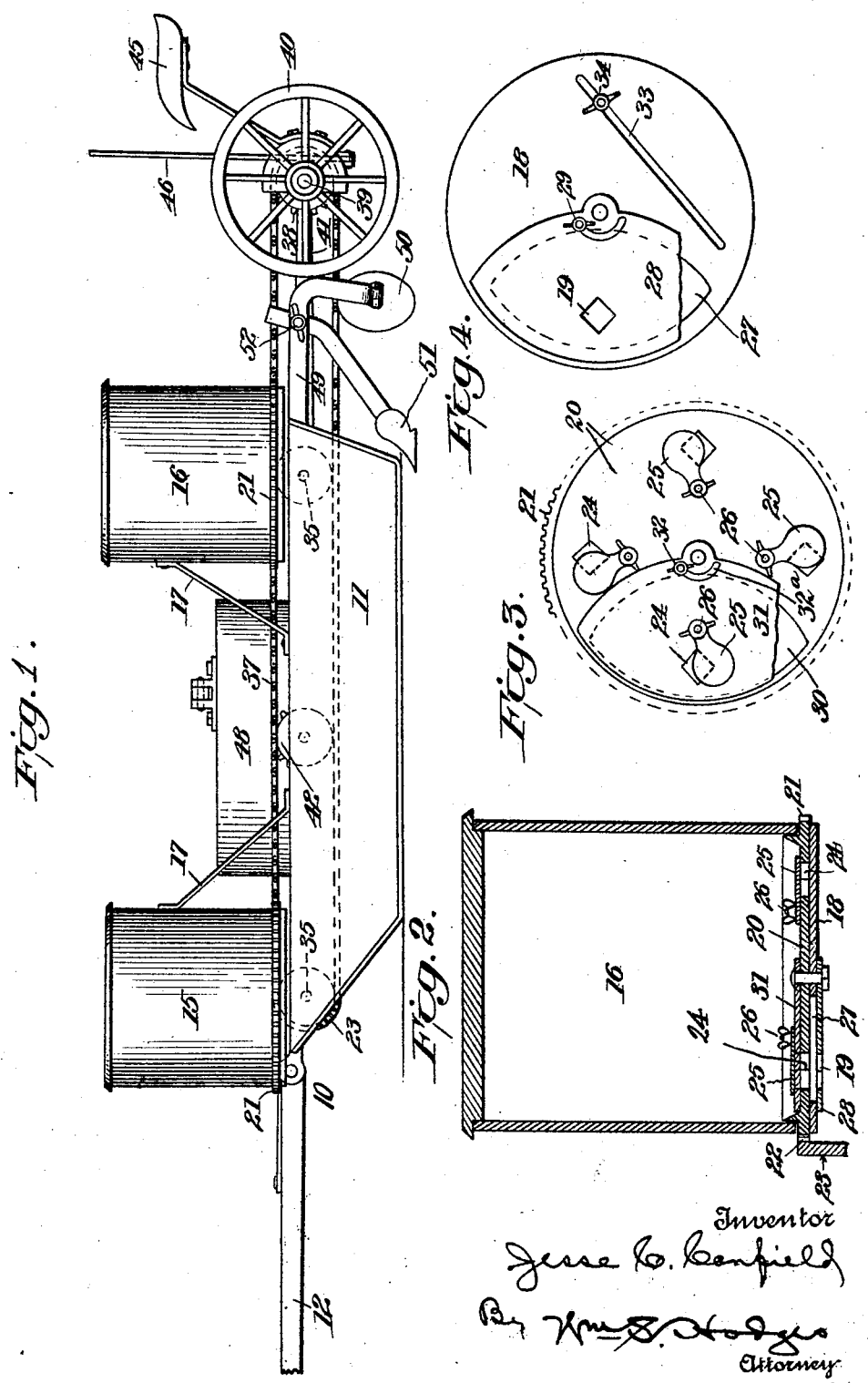
Inventor
Jesse C. Canfield
By Wm. S. Hodges
Attorney

UNITED STATES PATENT OFFICE.

JESSE C. CANFIELD, OF ELKINS, WEST VIRGINIA, ASSIGNOR OF ONE-HALF TO HARVEY MUSSER, OF AKRON, OHIO.

PLANTER.

1,325,139.     Specification of Letters Patent.     Patented Dec. 16, 1919.

Application filed June 8, 1915. Serial No. 32,921.

*To all whom it may concern:*

Be it known that I, JESSE C. CANFIELD, a citizen of the United States, residing at Elkins, in the county of Randolph and State of West Virginia, have invented new and useful Improvements in Planters, of which the following is a specification.

This invention is an improved planter of the type in which rotatable seed disks are employed, for controlling the discharge of the seeds from a can or receptacle, supported upon a suitable traveling support.

One of the objects of the invention is to produce an improved planter capable of handling seeds of all sizes, from the smallest to the largest, with equal facility. A further object is to provide a planter with means for depositing fertilizer, and for regulating the supply thereof, to conform to the requirements of the soil and the seed. A further object is to provide means for successively depositing fertilizer and seeds in the order named, at predetermined periods, so related that both fall in approximately the same place. A further object is to provide means for regulating the period of uniform distance elapsing between the successive depositions of the seeds. A further object is to provide a planter of the character referred to, which is simple in construction and efficient in operation, and which may be readily operated under minimum draft requirements.

The invention will be hereinafter fully set forth and particularly pointed out in the claims.

In the accompanying drawings:

Figure 1 is a side elevation of a planter constructed in accordance with the invention. Fig. 2 is a longitudinal sectional view illustrating one of the seed receptacles. Fig. 3 is a plan view of one of the seed disks. Fig. 4 is a similar view of the bottom plate of one of the seed receptacles.

Referring to the drawings, 10 designates a frame mounted upon runners 11, and constructed to be drawn forward in any suitable manner. For the purpose of supplying the draft a tongue 12 is attached to the frame in suitable manner, and to which the draft animals may be hitched in any well known manner.

Mounted over the forward corners of the frame 10, are fertilizer cans 15, but one appearing in the drawing, and similarly mounted over the rear corners of the frame, are seed cans or receptacles 16, said cans or receptacles being supported and braced by suitable stay rods 17. The fertilizer distributing devices 15 and the seed distributing devices 16 are identical in construction, each comprising a cylindrical body, and a bottom plate 18 rigidly secured beneath the same. Rotatably mounted upon the bottom plate 18 is a seed disk, or device for regulating the discharge of the contents of the receptacle, said disk being indicated at 20. The seed disk 20 is provided with a peripheral flange 21 extending through the side of the receptacle, and also provided with gear teeth which mesh with the teeth 22, on the face of a pinion 23. Each seed disk 20, is preferably provided with four equally spaced openings 24, the size of which is controlled by means of cover plates 25, one for each opening 24, hinged to threaded studs 26 carried by the seed disk, and held in adjusted position by means of thumb nuts working on said studs and bearing against the cover plates. Said cover plates are so positioned that they may be adjusted with respect to the forward corners of the openings 24, so that the discharge opening is formed by the forward edge of the cover plate and the corner of the opening covered thereby, the opening being made larger as the plate is moved away from said corner. The bottom plate 18 is provided with an enlarged opening 27, which is normally closed by an adjustable plate 28, which is held in adjusted position by means of a thumb nut 29. Said plate 28 is provided with an opening 19. Likewise the seed disk is provided with a similar opening 30, normally closed by a plate 31, held in adjusted position with respect to the opening, by means of a thumb screw 32, working on a bolt passed through slot 32ª. In practice the openings 24 and the discharge opening 19, are employed when the seeds to be deposited, are of a size to pass through said openings, or in the case of the fertilizer distributers, when said openings will discharge sufficient quantities. When larger seeds, or greater quantities of fertilizer are to be distributed, the plates 28 and 31 are adjusted so as to expose sufficient areas of the openings 27 and 30, and the bottom plate is adjusted so as to discharge the contents of the receptacle in the proper position, immediately ahead of, or behind the runners. To effect this adjustment, the bottom plate is provided with a slot 33 through which extends a threaded stud, provided with a thumb nut 34. The opening 24 is somewhat of diamond shape, so that in rotation of the said disk, one corner of the opening registers with the discharge opening 19, similarly shaped, in advance of the main portion of the said opening 24.

The pinions 23 are rigidly attached to drive shafts 35 extending transversely of the frame, said drive shafts being rotated by suitable driving means (not shown) actuated by a drive chain 37, which is driven by a gear 38, rigidly attached to a shaft 39, supported and rotated by traction wheels 40. The shaft 39 is rotatably mounted in arms 41 extending rearwardly from the frame. In order to support the chain between the shafts 35, an idler 42 is provided.

The driver or operator normally occupies a seat 45, supported in suitable manner from the frame, and located within convenient reach of the operator is a lever 46, controlling a suitable clutch by means of which the gear 38 may be placed into and out of operation. It is desirable, in working in the field, to have a full supply of all the necessary tools within convenient reach, and for this purpose a tool box 48, of ample size is provided.

Extending rearwardly from the frame are beams 49 to which are attached the rotating furrowing disks 50, and to said beams may be attached covering plows 51 where large seeds are planted, such as potatoes, and the like, which would not be furrowed deep by the markers. The plows 51 are removably attached by means of studs and thumb screws 52 and are for the purpose of making deep furrows.

In operation the cans 15 are filled with the desired fertilizing material, and the cans 16 are filled with the seeds, the openings 24 having been adjusted as to size, by moving the cover plates 25, before the cans or receptacles are filled. Or if the openings 24 are not to be utilized, the plates 28 and 31 are adjusted so that the openings 27 and 30 may coöperate to discharge the desired quantities. When the planter has been transported to the field to be used, the operator throws in the clutch for the purpose of rotating the shafts 35, and by means thereof the seed disk 20 is rotated, so that as the openings coincide, the fertilizer and the seed are respectively discharged, in the desired quantities. The parts as illustrated are designed to be proportioned so that each disk 20 will rotate once when the frame has traveled a distance equal to its length. In this manner, if all of the openings 24 in each disk are utilized, there will be four depositions of the seeds while the frame is traveling a distance equal to its length. If half the number of depositions are desired, it is obvious that the same may be secured by adjusting the cover plates 25 to cover two of the openings. Similarly, one deposition to cover the same period may be obtained by covering three of the openings. It will be noted that the fertilizer and the seeds are deposited in time with each other, and the operation of the disks is such that the seeds will be deposited at approximately the same points that fertilizer is distributed, after the latter has been slightly mixed with the earth, by the runner. The seeds after being deposited, are covered by the disks 50 or the wheels 40, as the case might be. In planting small seed the slide 28 is first positioned so as to close the opening 27. This will bring the opening 19 directly over the line along which the seed are to be planted thus insuring that they will be deposited in a straight row. In planting larger seed the slides 28 and 31 are relatively adjusted so that the space between their contiguous edges will be exactly over the line in which the seed are to be planted so as to insure that they will be deposited in a straight row.

Having thus explained the nature of my invention, and described an operative manner of constructing and using the same, although without attempting to set forth all of the forms in which it may be made, or all of the forms of its use, what I claim is:—

1. A planter of the character described comprising a receptacle, a bottom plate having a discharge opening therein, a cover plate adjustably attached to the underside of said bottom plate to close said discharge opening, said cover plate having a smaller discharge opening, a rotatable seed disk resting upon said bottom plate and provided with a plurality of openings positioned to successively register with the opening in the cover plate, independent covering means for the respective openings in the disk and adjustable to vary the effective sizes of the said openings in the disk, and means for rotating said disk.

2. A planter of the character described comprising a receptacle, a bottom plate having a discharge opening therein, a cover plate pivotally attached to the underside of said bottom plate to normally close said opening and having a smaller discharge opening, a rotatable seed disk resting upon the bottom plate and provided with a plurality of openings positioned to successively register with the opening in the cover plate, independent pivotally supported cover plates for the openings in said disk for varying the effective sizes of said disk openings, and means for rotating said disk.

3. A planter of the character described comprising a receptacle, a bottom plate having a discharge opening therein of substantial area, a rotatable disk resting upon said bottom plate and also having an opening of substantial area positioned to come into register with the opening in the bottom plate, independent means for adjustably varying the sizes of the respective openings, and means for rotating the disk.

4. A planter of the character described comprising a receptacle, a bottom plate having a discharge opening therein of substantial area, a cover plate for said opening adjustably attached to the underside of the bottom plate, a rotatable disk resting upon the bottom plate and also provided with an opening of substantial area positioned to come into register with the opening in the bottom plate, a cover plate for the opening in the disk adjustably attached to the top of said disk, and means for rotating said disk.

5. A planter of the character described comprising a receptacle, a bottom plate having a discharge opening therein of substantial area, a cover plate for said opening pivoted to the underside of said bottom plate and provided with a slot, a stud carried by the bottom plate and extended through said slot, a thumb screw working on said stud and engaging said cover plate, a rotatable disk resting upon said bottom plate and also provided with an opening of substantial area positioned to come into register with the opening in the bottom plate, a cover plate for the opening in said disk, said cover plate being pivoted to said disk, and provided with a slot, a stud carried by the disk and extending through the last mentioned slot, a thumb screw working on the last mentioned stud and engaging the cover plate attached to the disk, and means for rotating said disk.

6. A planter of the character described comprising a receptacle, a bottom plate having a discharge opening of substantial area, a cover plate for said opening pivoted to the bottom plate, a rotatable disk also provided with an opening of substantial area positioned to come into register with the opening in the bottom plate, a cover plate for the opening in said disk, means whereby the cover plates may be independently held in adjusted relation with respect to their openings, means for rotating the disk, and means for adjusting the bottom plate to vary the discharge position of the opening therein.

In testimony whereof I have hereunto set my hand in presence of two subscribing witnesses.

JESSE C. CANFIELD.

Witnesses:
BERTHA A. NEWBERRY,
ALBERT WELT.